United States Patent
Kamath

(10) Patent No.: US 11,327,729 B2
(45) Date of Patent: May 10, 2022

(54) FIELD DEVICE INTERFACES IN INDUSTRIAL CONTROL SYSTEMS

(71) Applicant: ABB Schweiz AG, Baden (CH)

(72) Inventor: Shanthala Kamath, Bangalore (IN)

(73) Assignee: ABB Schweiz AG, Baden (CH)

(*) Notice: Subject to any disclaimer, the term of this patent is extended or adjusted under 35 U.S.C. 154(b) by 49 days.

(21) Appl. No.: 16/616,993

(22) PCT Filed: Jul. 31, 2017

(86) PCT No.: PCT/IB2017/054651
§ 371 (c)(1),
(2) Date: Nov. 26, 2019

(87) PCT Pub. No.: WO2018/220431
PCT Pub. Date: Dec. 6, 2018

(65) Prior Publication Data
US 2020/0183665 A1 Jun. 11, 2020

(30) Foreign Application Priority Data
May 31, 2017 (IN) .............................. 201741019067

(51) Int. Cl.
*G06F 8/38* (2018.01)
*G05B 19/418* (2006.01)
(Continued)

(52) U.S. Cl.
CPC ............ *G06F 8/38* (2013.01); *G05B 19/4186* (2013.01); *H04L 41/22* (2013.01); *G05B 2219/31186* (2013.01)

(58) Field of Classification Search
CPC ...... G06F 8/38; G06F 3/0484; G06F 3/04845; H04L 41/22; G05B 2219/31186; G05B 19/4186
See application file for complete search history.

(56) References Cited

U.S. PATENT DOCUMENTS 6,587,124 B1 * 7/2003 Slaby .................. H04L 41/0856
715/735
8,782,539 B2 * 7/2014 Bump .............. G05B 19/41845
715/762
(Continued)

FOREIGN PATENT DOCUMENTS

EP 3163431 A1 5/2017

OTHER PUBLICATIONS

Daniel Grossmann et al., "OPC UA based Field Device Integration", [Online], pp. 933-938, [Retrieved from Internet on Feb. 8, 2021. <https://ieeexplore.ieee.org/stamp/stamp.jsp?tp=&arnumber=4654789> (Year: 2008).*

(Continued)

*Primary Examiner* — Ziaul A Chowdhury
(74) *Attorney, Agent, or Firm* — Leydig, Voit & Mayer, Ltd.

(57) ABSTRACT

Techniques for generating user interfaces (UIs) for field devices on a host device are described. A field device driver installed on the host device transmits a request for UI configuration to a field device. The field device includes a plurality of sets of UI parameters associated with configuration of the UI. The field device is configured to select a set of UI parameters from the plurality of sets of UI parameters based on application information provided to the field device. The field device driver receives the set of UI parameters from the field device in response to the request. Based on the set of UI parameters, the host device configures and generates the UI.

6 Claims, 4 Drawing Sheets

(51) Int. Cl.
 *H04L 41/22* (2022.01)
 *H04L 12/24* (2006.01)

(56) References Cited

U.S. PATENT DOCUMENTS

| | | | | |
|---|---|---|---|---|
| 9,298,334 | B1* | 3/2016 | Zimmerman | G06F 8/38 |
| 2007/0077665 | A1* | 4/2007 | Bump | G06F 3/0484 |
| | | | | 438/14 |
| 2012/0004743 | A1 | 1/2012 | Gowtham et al. | |
| 2013/0257627 | A1* | 10/2013 | Rafael | G05B 19/0426 |
| | | | | 340/691.6 |
| 2015/0234381 | A1* | 8/2015 | Ratilla | G01F 25/00 |
| | | | | 702/104 |
| 2017/0262164 | A1* | 9/2017 | Jain | G06F 8/38 |

OTHER PUBLICATIONS

Stefan Hodek et al., "Ad hoc field device integration using device profiles, concepts for automated configuration and web service technologies", [Online], pp. 1-6, [Retrieved from Internet on Dec. 30, 2021], <https://ieeexplore.ieee.org/stamp/stamp.jsp?arnumber=6197997> (Year: 2012).*

Hideyuki Fujii, "DTM supporting a wide range of field instruments and field networks", [Online], pp. 955-958, [Retrieved from Internet on Dec. 30, 2021], <https://ieeexplore.ieee.org/stamp/stamp.jsp?arnumber=6318578>, (Year: 2012).*

Dirk Schulz et al., "Seamless Maintenance—Integration of FDI Device Management & CMMS", [Online], pp. 1-7, [Retrieved from Interent on Dec. 30, 2021], <https://ieeexplore.ieee.org/stamp/stamp.jsp?arnumber=6647994> (Year: 2013).*

Huang Haokai et al., "Design of Remote Monitor System for Die Casting Units", [Online], pp. 252-255, [Retrieved from Internet on Dec. 30, 2021], <https://ieeexplore.ieee.org/stamp/stamp.jsp?arnumber=7784392> (Year: 2016).*

International Search Report for PCT/IB2017/054651, dated Jan. 18, 2018, 3 pages.

Written Opinion of the International Searching Authority for PCT/IB2017/054651, dated Jan. 18, 2018, 7 pages.

International Preliminary Report on Patentability for PCT/IB2017/054651, dated Dec. 3, 2019, 8 pages.

* cited by examiner

| | | | | | UI Views | | | | | | |
|---|---|---|---|---|---|---|---|---|---|---|---|
| | | Identification | Process values | Waveform display with blanking and pulse width adjustment | Calibration | Simulation | Parameterization for single level | Parameterization for dual level | Diagnosis | Diagnosis simulation | Diagnosis masking |
| Application | Single level | Yes | Yes | Yes | Yes | Yes | Yes | No | Yes | Yes | Yes |
| | Dual level with interface | Yes | Yes | Yes | Yes | Yes | No | Yes | Yes | Yes | Yes |
| | Ullage | Yes | Yes | Yes | Yes | Yes | Yes | No | Yes | Yes | Yes |
| | Storage tank level | Yes | Yes | No | Yes | No | Yes | Yes | Yes | No | No |
| | Active tank level | Yes | Yes | Yes | No | No | Yes | No | Yes | No | No |
| Other Presets | Basic | Yes | Yes | No | Yes | No | Yes | No | Yes | No | No |
| | Advanced | Yes | Yes | Yes | Yes | Yes | Yes | Yes | Yes | Yes | Yes |
| | All | Yes | Yes | No | No | No | No | No | No | No | No |
| | Minimal | No | Yes | No | No | No | No | No | No | No | No |
| User customization | | Yes/No | Yes/No | Yes/No | Yes/No | Yes/No | Yes/No | Yes/No | Yes/No | Yes/No | Yes/No |

Fig. 4

FIELD DEVICE INTERFACES IN INDUSTRIAL CONTROL SYSTEMS

CROSS-REFERENCE TO RELATED APPLICATIONS

This application is a national stage entry under 35 U.S.C. § 371 of PCT International Stage Patent Application No. PCT/IB2017/054651, filed Jul. 31, 2017, which claims priority to Indian Patent Application No. 201741019067, filed May 31, 2017. The entire disclosures of the foregoing applications are incorporated herein by reference.

TECHNICAL FIELD

The present subject matter relates, in general, to field devices used in industrial control systems and, in particular, to interfaces for the field devices.

BACKGROUND

An industrial control system is a control system for an industrial plant. The industrial plant may be of different industries, such as chemical industry, petrochemical industry, power generation industry, and metallurgical industry. The industrial control system includes a plurality of field devices that sense/measure various parameters (for example, pressure, temperature) in the industrial plant. A field device can be accessed from a host device through the user interface (UI) provided by a device driver associated with the field device. The device driver can be installed on a host device, on which the UI is displayed.

BRIEF DESCRIPTION OF DRAWINGS

The features, aspects, and advantages of the present subject matter will be better understood with regard to the following description, and accompanying figures. The use of the same reference number in different figures indicates similar or identical features and components.

FIG. 4 illustrates views to be displayed for different applications and presets of a field device, in accordance with an implementation of the present subject matter.

DETAILED DESCRIPTION

Figure 1:
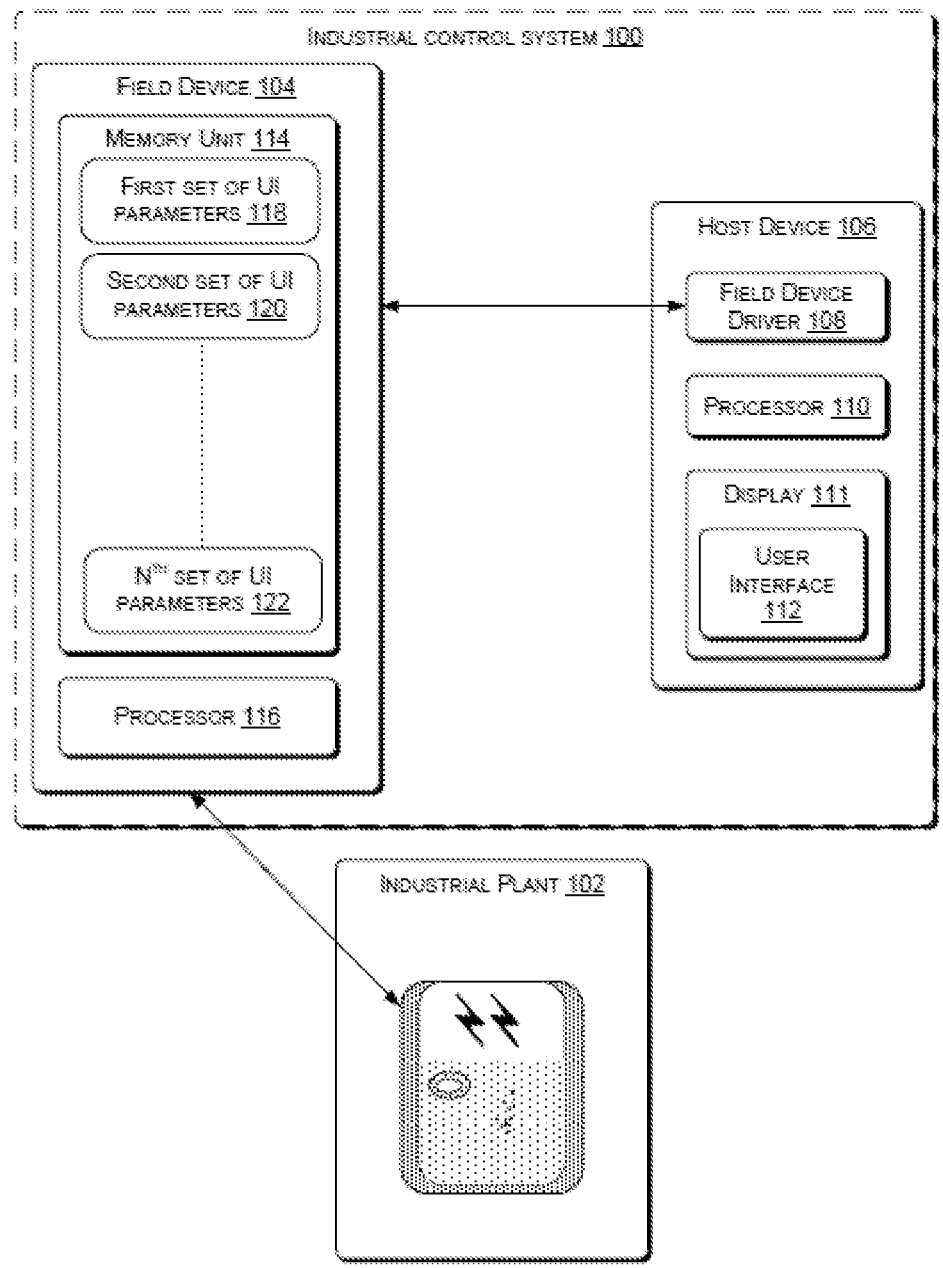
FIG. 1 illustrates an industrial control system, in accordance with an implementation of the present subject matter.

The present subject matter relates to field devices and field device drivers in industrial control systems.

Industrial control systems can include a plurality of field devices in an industrial plant for measuring/sensing various operating parameters, such as temperature and pressure. Based on the operating parameters, the industrial control systems may perform one or more control operations. A field device can be accessed from a host device for performing one or more activities, such as configuring the field device, calibrating the field device, running diagnostics on the field device, and the like.

The field device can be accessed from the host device using a field device driver associated with the field device. The field device driver can provide a user interface (UI) associated with the field device, using which the field device can be accessed. Typically, the UI includes a plurality of data fields and menu trees provided in a plurality of views, from which various activities can be performed in relation to the field device.

Conventionally, all the views, data fields, and the menu trees, that are built in to the device driver are displayed on the UI irrespective of the application in which the specific field device is deployed. For example, a field device may be deployed in an application where the sensor settings should not be changed after commissioning. In another example, another field device of the same type may be deployed in an application where only the calibration is to be performed on a regular basis. In both cases, a host device with a device driver will present to the user with the same exhaustive list of data fields, menu trees, and the views, on the UI. Here, the term "application" refers to the purpose for which the field device is to be deployed in an industrial plant. For example, the purpose of a level field device may be measuring single level (single level application), measuring ullage (ullage application), measuring storage tank level (storage tank level application), measuring active tank level (active tank level application). According to the application, some of the views, menu trees, and data fields may not be necessary.

The provision of all the views irrespective of the application the field device is deployed for may lead to inadvertent changes to the field devices, for example, by inexperienced users.

Sometimes, a user may configure a host device from which the field device can be accessed so that a subset of the plurality of views are displayed on the UI. Further, the information as to which views are to be displayed on the user interface may be stored in the host device for subsequent access. However, since the field device can be accessed from different host devices, in order to limit the views displayed to the subset of the plurality of views, each host device has to be manually configured by the user and the information regarding the views to be displayed is to be separately stored in each host device. As will be understood, this is a cumbersome and error prone process.

The present subject matter relates to systems and methods for generating user interfaces for field devices on host devices. With the systems and methods of the present subject matter, user interfaces can be configured and generated based on the application requirements of the field devices.

In an implementation of the present subject matter, a field device driver installed on a host device transmits a request for user interface (UI) configuration to a field device. The field device includes a plurality of sets of UI parameters, each associated with a configuration of the UI. The field device driver then receives a set of UI parameters from the field device in response to the request. Based on the set of UI parameters, the host device configures and generates the UI for operating the field device. The set of UI parameters corresponds to application information provided to the field device. The application information is indicative of the application for which the field device is deployed.

In an implementation of the present subject matter, the field device includes a memory unit to store a plurality of sets of UI parameters. Each set of UI parameters correspond to a different application the field device is deployable for and is associated with the configuration of the UI. When the field device receives application information indicative of the application the field device is to be deployed for or is deployed for, the field device selects a set of parameters based on the application information. Thereafter, when the field device receives a request for UI configuration from the field device driver, the field device transmits the at least one set of UI parameters to the field device driver.

With the systems and methods of the present subject matter, the UI to be displayed for a field device on a host device can be generated based on the application for which the field device has been deployed. In an implementation, since the sets of UI parameters is stored in the field device, the UI can be adapted based on the application independent of the host device from which the user is accessing the field device. This reduces the inadvertent changes to the field device, and therefore, improves the overall safety of the field device and the industrial plant.

The above and other features, aspects, and advantages of the subject matter will be better explained with regard to the following description, appended claims, and accompanying figures.

FIG. 1 illustrates an industrial control system 100, in accordance with an implementation of the present subject matter. The industrial control system 100 may perform the control functions in an industrial plant 102. The industrial plant 102 may belong to any industry sector, such as pharmaceutical, chemical, mineral, oil and gas, and power generation industry.

The industrial control system 100 includes a field device 104. The field device 104 is capable of sensing and/or measuring physical parameters, such as temperature, pressure, tank level, and the like. In an implementation, the field device may also be capable of sensing and/or measuring chemical parameters. For this, the field device 104 may include, for example, gas detectors and the like. Although the field device 104 is shown outside the industrial plant 102, it will be understood that the field device 104 would be disposed in the industrial plant 102, to sense and/or measure industrial plant data and provide it to other components of the industrial control system 100. The field device 104 can include a sensor (not shown in FIG. 1) for sensing and/or measuring physical parameters and converting it into an electrical signal. The sensor can be, for example, a pressure transducer, a thermocouple, or the like. The field device 104 can also include a transmitter (not shown in FIG. 1) to convert the electrical signal generated by the sensor into a corresponding digital value and transmit it to another device. The transmitter can include, for example, an analog/digital (A/D) converter.

The industrial control system 100 also includes a host device 106, from which the field device 104 can be operated. Here, operating the field device 104 refers to performing various operations on the field device, which include, but are not restricted to, accessing, monitoring, diagnosing, and configuring the field device 104. The host device 106 can be a generic computing device, such as a desktop computer, a laptop, a smartphone, a personal digital assistant (PDA), and a tablet, or a proprietary handheld device.

The host device 106 can communicate with the field device 104, and can be used by a user to access the field device 104 for performing one or more activities in relation to the field device 104. For example, the user can view identification information and diagnostic information of the field device 104 and configure one or more parameters of the field device 104 from the host device 106. The host device 106 can communicate with the field device 104 using a field device communication protocol, such as FOUNDATION Fieldbus, PROFIBUS®, or Highway Addressable Remote Transducer (HART®) protocol.

In order to communicate with and access the field device 104, the host device 106 has installed thereon a device driver 108 associated with the field device 104. The device driver 108 associated with the field device 104 will be interchangeably referred to as a field device driver 108. The field device driver 108 may be implemented as instructions executed by a processor 110 in the host device 106 to enable communication with the field device 104. For example, the field device driver 108 enables obtaining the process variable parameters, diagnostic data from self-diagnosis and process diagnosis, and identification parameters of the field device 104. The field device driver 108 may comply with a standard, such as electronic device description language (EDDL), field device tool/device type manager (FDT/DTM), and field device integration (FDI).

When the host device 106 is a generic computing device, the host device 106 has installed thereon an application tool that can interact with the field device driver 108 for enabling access of the field device 104 from the host device 106. Examples of the application tool include ABB® Asset Vision Basic and Siemens® SIMATIC® PDM. As mentioned earlier, the host device 106 can be a proprietary handheld device. The proprietary handheld device has the field device driver 108 built-in. Examples of the proprietary handheld device include ABB® DHH805 and 475 Field Communicator from Emerson™.

The host device 106 includes a display device 111, on which a user interface (UI) 112 can be provided. The UI 112 is configured for access to the field device 104. When the host device 106 is a generic computing device, the UI 112 may be provided by the application tool by interacting with the field device driver 108. When the host device 106 is a proprietary handheld device, the UI 112 may be pre-stored in the host device 106 at the time of its manufacturing.

The UI 112 can include data fields and menu trees, using which various operations can be performed on the field device 104. The data fields and the menu trees can be displayed in one or more views of the UI 112. In an example, a menu tree and the data fields associated with the menu tree are displayed in one view of the UI 112. The host device 106 can provide the views on the UI 112 by interacting with the field device driver 108.

Even though the UI 112 can include a plurality of data fields and a plurality of menu trees, however, not all of the data fields and menu trees may have to be or need to be provided on the UI 112 for a particular application for which the field device 104 is deployed. Therefore, the UI 112 is to be configured based on the application the field device 104 is deployed for.

In order to configure the UI 112, a plurality of sets of UI parameters is utilized. Each set of UI parameters is associated with the configuration of the UI 112. In an implementation, the set of UI parameters specifies at least one of which views, data fields, and menu trees that are to be displayed on the UI 112 for the field device 104.

The plurality of sets of UI parameters may be stored in a memory unit 114 in the field device 104, for example, at the time of manufacturing the field device 104. The memory unit 114 may be any non-transitory computer-readable medium including, such as volatile memory (e.g., RAM), or non-volatile memory (e.g., EPROM, flash memory, Memristor, etc.). The field device 104 can also include a processor 116 to perform various functions in the field device.

In an implementation, each set of UI parameters of the plurality of sets of UI parameters is associated with a particular application for which the field device 104 can be deployed. Here, the term "application" refers to the purpose for which the field device is to be deployed in an industrial plant. For example, the purpose of a level field device may be measuring single level (single level application), measuring ullage (ullage application), measuring storage tank level (storage tank level application), measuring active tank level (active tank level application), or a combination of applications.

Accordingly, the memory unit 114 can have stored thereon a plurality of sets of UI parameters, each corresponding to a different application for which the field device 104 can be deployed. In an example, the memory unit 114 has stored thereon a mapping of applications and their corresponding sets of UI parameters.

As will be understood, the memory unit 114 can include any number of sets of UI parameters depending on the number of applications for which the field device 104 can be deployed. The sets of UI parameters in the memory unit 114 may be collectively referred to as a plurality of sets of UI parameters. Each set of UI parameters stored in the field device 104 specifies one or more views of the UI 112 to be displayed for the field device 104 when the field device 104 is accessed from the host device 106. Alternatively, or in addition, each set of UI parameters may also specify the menu sets and/or data fields to be displayed on the UI 112.

In an implementation, the plurality of sets of UI parameters, along with the specification of views, menu trees, and data fields corresponding to each of them, can be stored in the field device 104 at the time of its manufacturing. Thereafter, at a later time, for example during the installation of the field device 104 for its application, the application for which the field device 104 is to be installed is specified to the field device 104. The specification of the application to the field device 104 is also referred to as providing application information to the field device 104. As will be understood, the application information is indicative of the application the field device is deployed for or is to be deployed for.

Upon receiving the application information, the field device 104 selects a set of UI parameters corresponding to the application. Thereafter, when the field device 104 receives a request for UI configuration from the field device driver 108, the field device 104 transmits the set of UI parameters to the field device driver 108. Based on the set of UI parameters, the host device 106 can configure the UI 112. The configuration of the UI 112 based on the set of UI parameters will be explained with reference to FIG. 2.

Figure 2:
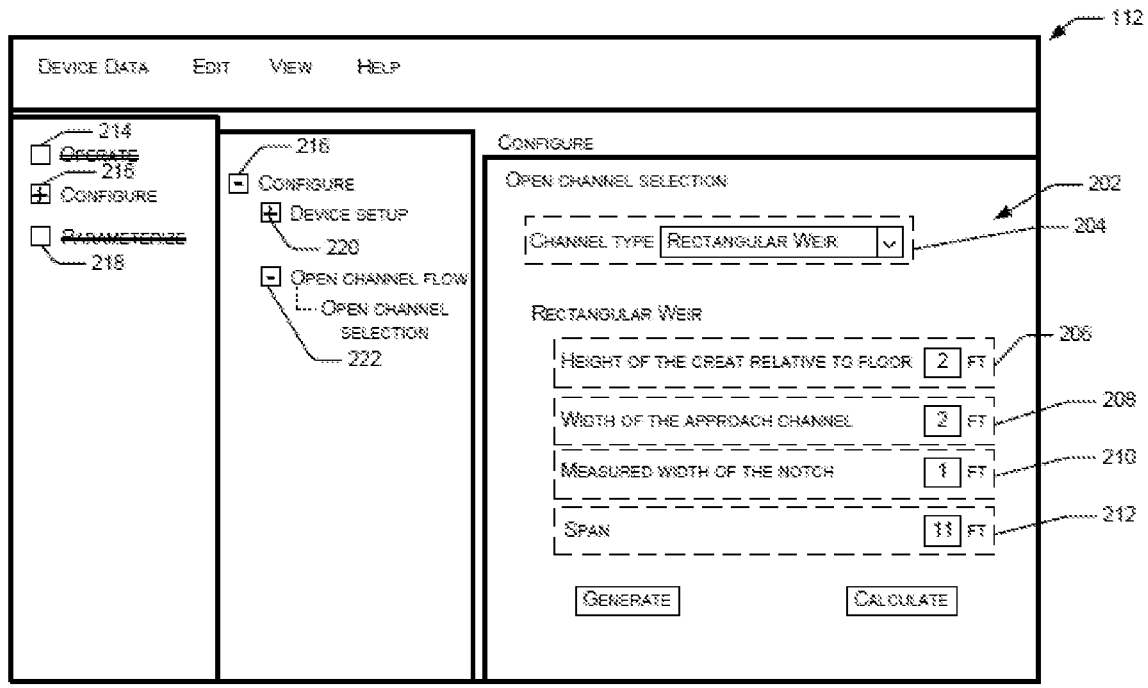
FIG. 2 illustrates a user interface (UI) of a device driver associated with a field device, in accordance with an implementation of the present subject matter.

FIG. 2 illustrates an example UI 112, in accordance with an implementation of the present subject matter. As explained earlier, the UI 112 can include a plurality of data fields and menu trees. Data fields refer to fields that provide information regarding parameters of the field device 104 and from where the parameters can be configured. The plurality of data fields may be provided in a data field area 202. For example, the data field area 202 can include a plurality of data fields 204, 206, 208, 210, and 212. Further, menu trees refer to various menus related to the field device 104 provided in the form of a tree structure. Examples of the menu trees are an operate menu tree 214, configure menu tree 216, and parameterize menu tree 218. Each menu tree can have one or more data fields associated with it. Using the menu trees, various options can be navigated to for performing the one or more activities. As will be understood, the menu trees may include sub-menu trees, sub-sub-menu trees, and so on. The menu trees and data fields may be provided in one or more views of the UI 112.

As mentioned earlier, the UI 112 can be configured based on the set of UI parameters. For this, the field device driver 108 can transmit a request for user configuration to the field device 104. In response to the request for UI configuration, the field device driver 108 receives the set of UI parameters associated with the application for which the field device 104 is deployed. As mentioned earlier, the set of UI parameters can specify at least one of which views, data fields, and menu trees are to be displayed on the UI 112.

In an example, the set of UI parameters specifies that the configure menu tree 216, related to configuration of the various parameters of the field device 104, is to be provided on the UI 112, whereas the operate menu tree 214 and parameterize menu tree 218 are not to be provided. Based on the set of UI parameters, the host device 106 can then configure the UI 112. In this case, host device 106 can configure the UI 112 such that the operate menu tree 214 and parameterize menu tree 218 cannot be used. For example, the UI configuration can prevent the operate menu tree 214 and parameterize menu tree 218 from expanding upon selection by a user.

Although the menu trees associated with operation, configuration, and parameterization are shown to be displayed on a single view of the UI 112, it is to be understood that they may be shown on different views. Accordingly, the set of UI parameters can specify that the views associated with operation and parameterization are not to be displayed on the UI 112.

Based on the set of UI parameters, the configured UI 112 can then be generated by the host device 106. In an example, the configuration and generation of the UI 112 can be performed by the application tool that interacts with the field device driver 108.

In an example, the configuration of the UI 112 is such that the operate menu tree 214 and parameterize menu tree 218 are displayed with a strike-through, as illustrated. Although the operate menu tree 214 and the parameterize menu tree 218 are shown with a strike-through in response to the set of UI parameters, other ways of configuring the UI 112 are also possible. For example, the operate menu tree 214 and the parameterize menu tree 218 may not be displayed on the generated UI 112. In another example, the views associated with operation and parameterization of the field device 104 are not displayed on the UI 112. Overall, it is to be understood that the configuration of UI 112 refers to adapting the UI 112 such that only the views, menu trees, and data fields that are to be displayed for the application are displayed on the UI 112.

In the above example, since the set of UI parameters specifies that the configure menu tree 216 can be provided for the current application, the configure menu tree 216 and its sub-menu trees are provided on the UI 112. Accordingly, a user can navigate to the various menus and sub-menus through the configure menu tree 216 to perform various configuration operations. Based on the navigation, the data fields associated with the menus and sub-menus may be shown.

Although the set of UI parameters are explained as specifying the menu tree to be provided on the UI 112, in an implementation, the UI parameters can also specify the sub-menu trees that are not to be provided. For example, the set of UI parameters can specify that the "DEVICE SETUP" sub-menu tree 220 is not to be provided on the UI 112. Accordingly, the user can access the "OPEN CHANNEL FLOW" sub-menu tree 222 alone on the configure menu tree 216, and not the "DEVICE SETUP" sub-menu tree 220. Further, the set of UI parameters can also specify the data fields to be not provided on the UI 112. For example, the set of UI parameters can specify that the data field 204 is not to be shown on the UI 112.

Figure 3:
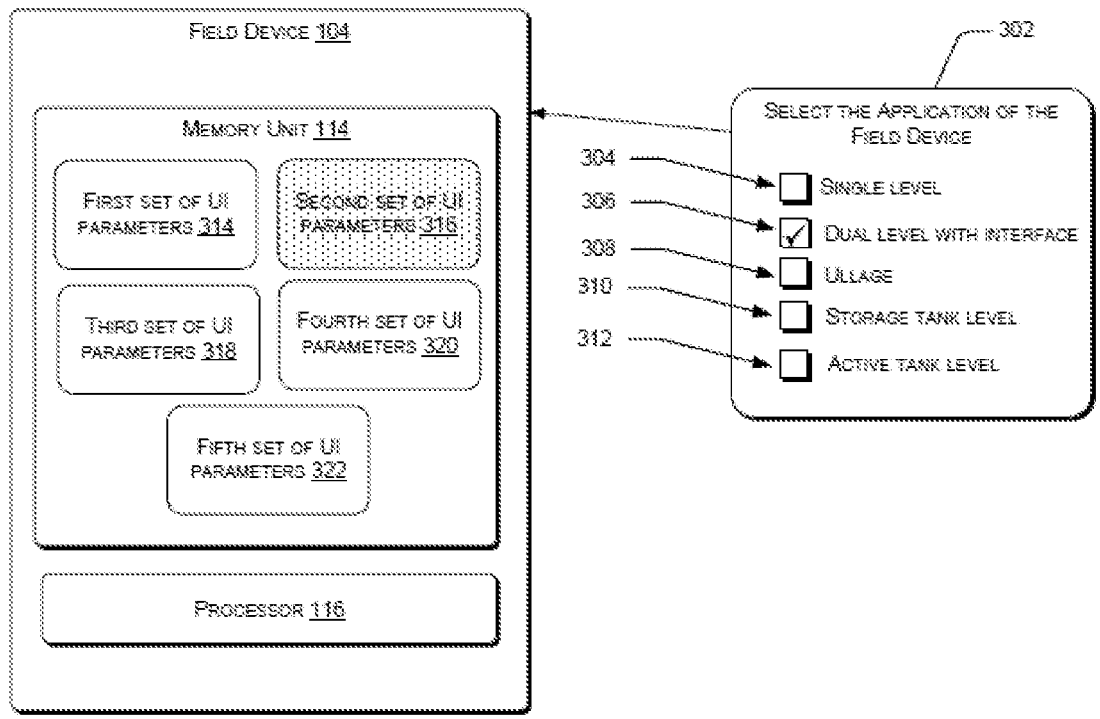
FIG. 3 illustrates selection of a set of UI parameters from a plurality of sets of UI parameters, in accordance with an implementation of the present subject matter.

FIG. 3 illustrates selection of a set of UI parameters from a plurality of sets of UI parameters when the field device 104 is a level field device, in accordance with an implementation of the present subject matter. A level field device refers to type of a field device that can measure levels of, for example, liquids.

The plurality of sets of UI parameters, the applications they correspond to, and with the specification of views, menu trees, and data fields corresponding to each set of UI parameters can be stored in the field device 104 at the time of its manufacturing. Thereafter, at a later time, for example during the deployment of the field device 104 for its application, the application information can be provided to the field device. The specification can be performed, for example, through a local human machine interface (HMI) of the field device 104 or through a computing system, such as the host device 106, having the field device driver 108 installed thereon. For the specification, a menu window 302 may be provided on the local HMI or the computing system.

Although the provision of the application information to the field device 104 is explained to be performed at the time of deployment of the field device 104, the application information can be provided at a later time as well, such as after its deployment for the application, i.e., during the course of normal usage of the field device 104 in the application. Further, in an implementation, the application information provided to the field device 104 at the time of installation can be overridden (by providing new application information) at a later time.

The menu window 302 can include a list of all possible applications for which the field device 104 can be deployed as options. For example, when the field device 104 is a level field device, the menu window 302 can include a "SINGLE LEVEL" option 304, "DUAL LEVEL WITH INTERFACE" option 306, "ULLAGE" option 308, "STORAGE TANK LEVEL" option 310, and "ACTIVE TANK LEVEL" option 310. A user, such as the commissioning engineer, can then select the application. For example, as illustrated in FIG. 3, the user selects the "DUAL LEVEL WITH INTERFACE" option 306.

As explained earlier, each application corresponds to a particular set of UI parameters. Accordingly, upon selection of the application by the user, the set of UI parameters corresponding to that application is selected. For example, as illustrated, upon selection of the "DUAL LEVEL WITH INTERFACE" option 306, a second set of UI parameters 316 is selected.

Although not shown in FIG. 3, the menu window 302 can include a plurality of presets to load a preset of views, menu trees, and/or data fields to be displayed. Example presets include, but are not restricted to, basic, advanced, all, and minimal. Further, the menu window 302 can include a "user customizable" option, through which the user can individually select at least one of the views, menu trees, and/or data fields to be displayed. In an example, the user can select the "user customizable" option even after the field device 104 is deployed for the application and then select the views, menu trees, and/or data fields to be displayed on the UI 112. In this manner, the UI 112 can be configured at any stage of the operation of the field device 104.

The views associated with the different applications and presets is explained with reference to FIG. 4.

FIG. 4 illustrates the views to be displayed for different applications and presets for a level field device, in accordance with an implementation of the present subject matter.

Here, "Yes" means that the particular view is to be shown for the particular application. Contrarily, "No" means that the particular view is not to be shown for the particular application. For example, the view "Identification" is to be shown for the "Single level" application, whereas the view "Parameterization for dual level" is not to be shown.

The information provided in the matrix form in FIG. 4 can be stored in the field device 104 as the plurality of sets of UI parameters during the time of its manufacturing. In an implementation, the user can edit any set of UI parameters. For example, the user can specify a view marked as "No" for a particular application as "Yes". The editing can be performed from the local HMI of the field device 104 or from the host device 106. For this, a menu window can be provided (not shown in FIG. 4) in which the user can provide an input for editing a set of UI parameters, such as by selecting or deselecting views from an exhaustive list of all views. Accordingly, the set of UI parameters can be modified and stored in the memory unit 114.

Although FIG. 4 illustrates the selection of views corresponding to the applications, as explained earlier, the selection of menu trees and data fields can also be made for different applications and presets and stored in the field device 104.

In an implementation, in addition to configuring and generating UI based on the application of the field device 104, the UI can also be configured based on the user accessing the UI 112 from the host device. Here, the term "user" may refer to a specific individual or any person in a particular role, such as operator, viewer, or engineer. In accordance with the implementation, each of the set of UI parameters can correspond to a particular user in a particular application. Accordingly, the request for UI configuration, transmitted by the field device driver 108, can include the user information associated with a user of the host device 106. In another implementation, the user information can be transmitted by the field device driver 108 separately from the request for UI configuration.

In an example, when the term "user" refers to a specific individual, the user information is a user identity information, which may include a name or an identifier of the individual. In another example, when the term "user" refers to any person in a particular role, the user information is user role information that indicates the role of the person, such as viewer, operator, engineer, or administrator. The user information can indicate the one or more activities that the user is authorized to perform in relation to the field device 104. For example, when the user information indicates that the user is an engineer, the user can perform a wide range of activities, from viewing the basic field device information to configuring the operational parameters, on the field device 104.

Based on the user information, the field device 104 can select the set of UI parameters and transmit it to the field device driver 108.

The industrial control system 100 may include a plurality of field devices similar to the field device 104. For example, if the field device 104 is a pressure transmitter, the industrial control system 100 can include a plurality of other pressure transmitters.

Figure 5:
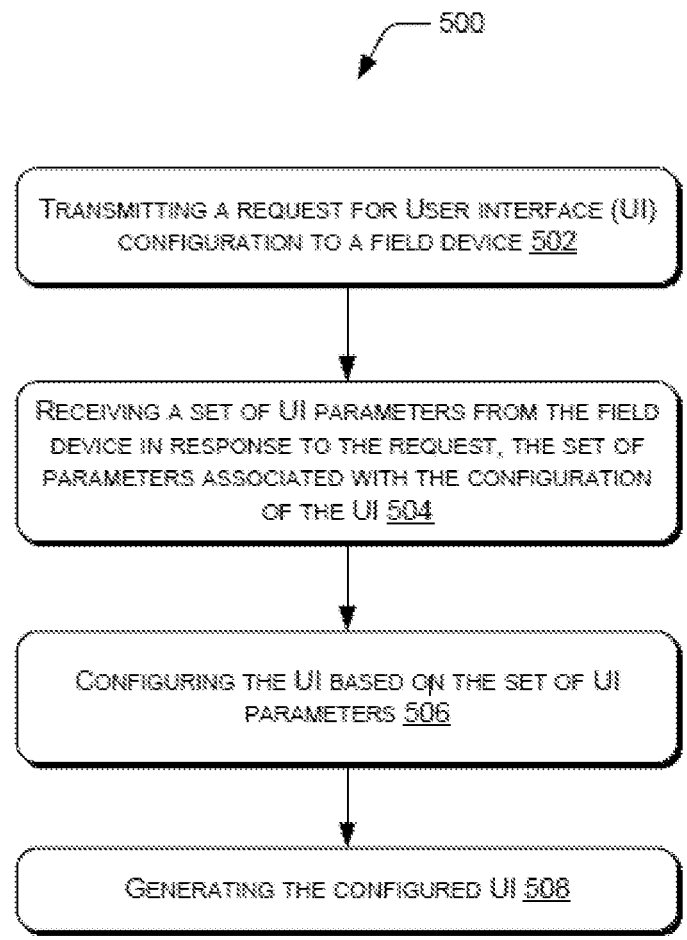
FIG. 5 illustrates a method for generation of a UI on a host device for a field device in an industrial control system, in accordance with an implementation of the present subject matter.

FIG. 5 illustrates a method 500 for generation of a UI on a host device for a field device in an industrial control system of an industrial plant, in accordance with an implementation of the present subject matter. The industrial control system can be, for example, the industrial control system 100, the field device can be, for example, the field device 104, the host device can be, for example, host device 106, and the UI can be, for example, the UI 112. The UI can be configured for access to the field device. The UI can be used for operating the field device.

The order in which the method 500 is described is not intended to be construed as a limitation, and any number of the described method blocks may be combined in any order to implement the method 500, or an alternative method. Furthermore, the method 500 may be implemented by processor(s) or computing device(s) through any suitable hardware, non-transitory machine readable instructions, or a combination thereof.

It may be understood that steps of the method 500 may be performed by programmed computing devices and may be executed based on instructions stored in a non-transitory computer readable medium. Although the method 500 may be implemented in a variety of systems, the method 500 is described in relation to the industrial control system 100, for ease of explanation.

At step 502, a field device driver installed on the host device transmits a request for UI configuration to the field device. The field device includes a plurality of sets of UI parameters associated with the configuration of the UI. The set of UI parameters can be, for example, the set of UI parameters 118, 120, . . . , or 122. In an example, a plurality of views, data fields and menu trees can be displayed on the UI, and the set of UI parameters can specify at least one of views, menu trees, and data fields to be displayed on the UI. The plurality of sets of UI parameters and a mapping of the applications they correspond to can be provided to the field device at the time of its manufacturing.

In an implementation, the field device can be accessed by a plurality of users from the host device. In accordance with the implementation, each of the plurality of sets of UI parameters can correspond to a particular user in a particular application. Further, in accordance with the implementation, the request for UI configuration can also include user information indicative of the user accessing the field device from the host device. Based on the user information, the field device selects the set of UI parameters. The user information may also be sent separately from the request for UI configuration.

At step 504, the field device driver receives a set of UI parameters from the field device in response to the request. The set of UI parameters corresponds to the application information provided to the field device. The application information is indicative of the application the field device is deployed for. The set of UI parameters can be selected by the field device from the plurality of sets of UI parameters based on the application information provided to the field device. The application information can be provided to the field device in a manner as explained with reference to FIG. 3. As explained with reference to FIG. 3, the application information can be provided to the field device at the time of its deployment for the application.

At step 506, the host device configures the UI based on the set of UI parameters. In an implementation, the configuration of the UI includes determining which of the plurality of views, data fields, and menu trees are to be displayed on the UI based on the set of UI parameters, as explained with reference to FIGS. 1 and 2.

At step 508, the configured UI is generated. The generated UI can be used for accessing, configuring, and operating the field device.

The methods and systems of the present subject matter enable configuring the UI for a field device based on the application of the field device. Since the set of UI parameters, based on which the UI is configured, is stored in the field device, a configured UI can be generated irrespective of the host device from which the field device is accessed from. Further, the configuration of UI based on the application ensures that options required for the application are provided on the UI. This improves the overall security of the field device and the industrial plant.

Although the present subject matter has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter.

The invention claimed is:

1. A method for generating a user interface (UI) on a host device, the UI being configured for access to a field device in an industrial control system of an industrial plant, wherein the field device is installed in the industrial plant for a first application, the method comprising:
   transmitting, by a field device driver installed on the host device, a request for UI configuration to the field device, wherein the field device comprises a memory unit storing a plurality of sets of UI parameters, each set of UI parameters of the plurality of sets of UI parameters being associated with a configuration of the UI and corresponding to a different application for which the field device may be deployed, wherein the field device is accessible by a plurality of users from the host device;
   transmitting, by the host device, user information indicative of a user accessing the field device from the host device;
   receiving, by the field device driver installed on the host device and in response to the request, a first set of UI parameters from the field device, wherein the field device selects the first set of UI parameters from the plurality of sets of UI parameters in the memory unit of the field device based on application information indicative of the first application for which the field device is deployed in the industrial plant and the user information;
   configuring, by the host device, the UI based on the received first set of UI parameters; and
   generating, by the host device, the configured UI, wherein the configured UI corresponds to the first application associated with the field device, wherein the application information of the first application is provided to the field device upon commissioning of the field device in the industrial plant.

2. The method as claimed in claim 1, wherein a plurality of views, menu trees, and data fields are displayable on the UI, and wherein the first set of UI parameters specifies at least one of the plurality of views, menu trees, and data fields to be displayed on the UI.

3. The method as claimed in claim 1, further comprising the field device driver communicating with the field device in one of a FOUNDATION Fieldbus, PROFIBUS®, Modbus, ISA 100, PROFINET and Highway Addressable Remote Transducer (HART®) protocol.

4. A host device in an industrial control system of an industrial plant, wherein the host device is configured to:
   transmit a request for UI configuration to a field device installed in the industrial plant, wherein the field device comprises a memory unit storing a plurality of sets of UI parameters, each set of UI parameters of the plurality of sets of UI parameters being associated with a configuration of the UI and corresponding to an application for which the field device may be deployed, wherein the field device is accessible by a plurality of users from the host device;

transmit user information indicative of a user accessing the field device from the host device;

receive in response to the request a first set of UI parameters from the field device, wherein the field device selects the first set of UI parameters from the plurality of sets of UI parameters in the memory unit of the field device based on application information indicative of a first application for which the field device is deployed in the industrial plant and the user information;

configure the UI based on the received first set of UI parameters; and generate the configured UI, wherein the configured UI corresponds to the first application associated with the field device, wherein the application information of the first application is provided to the field device upon commissioning of the field device in the industrial plant.

5. The host device as claimed in claim 4, wherein a plurality of views, menu trees, and data fields are displayable on the UI, and wherein the first set of UI parameters specifies at least one of the plurality of views, menu trees, and data fields to be displayed on the UI.

6. The host device as claimed in claim 4, wherein the host device is configured to communicate with the field device in one of a FOUNDATION Fieldbus, PROFIBUS®, Modbus, ISA 100, PROFINET and Highway Addressable Remote Transducer (HART®) protocol.

* * * * *